Nov. 28, 1933.  G. S. LOMBARD  1,937,237
LUBRICATING SYSTEM
Filed Nov. 21, 1932
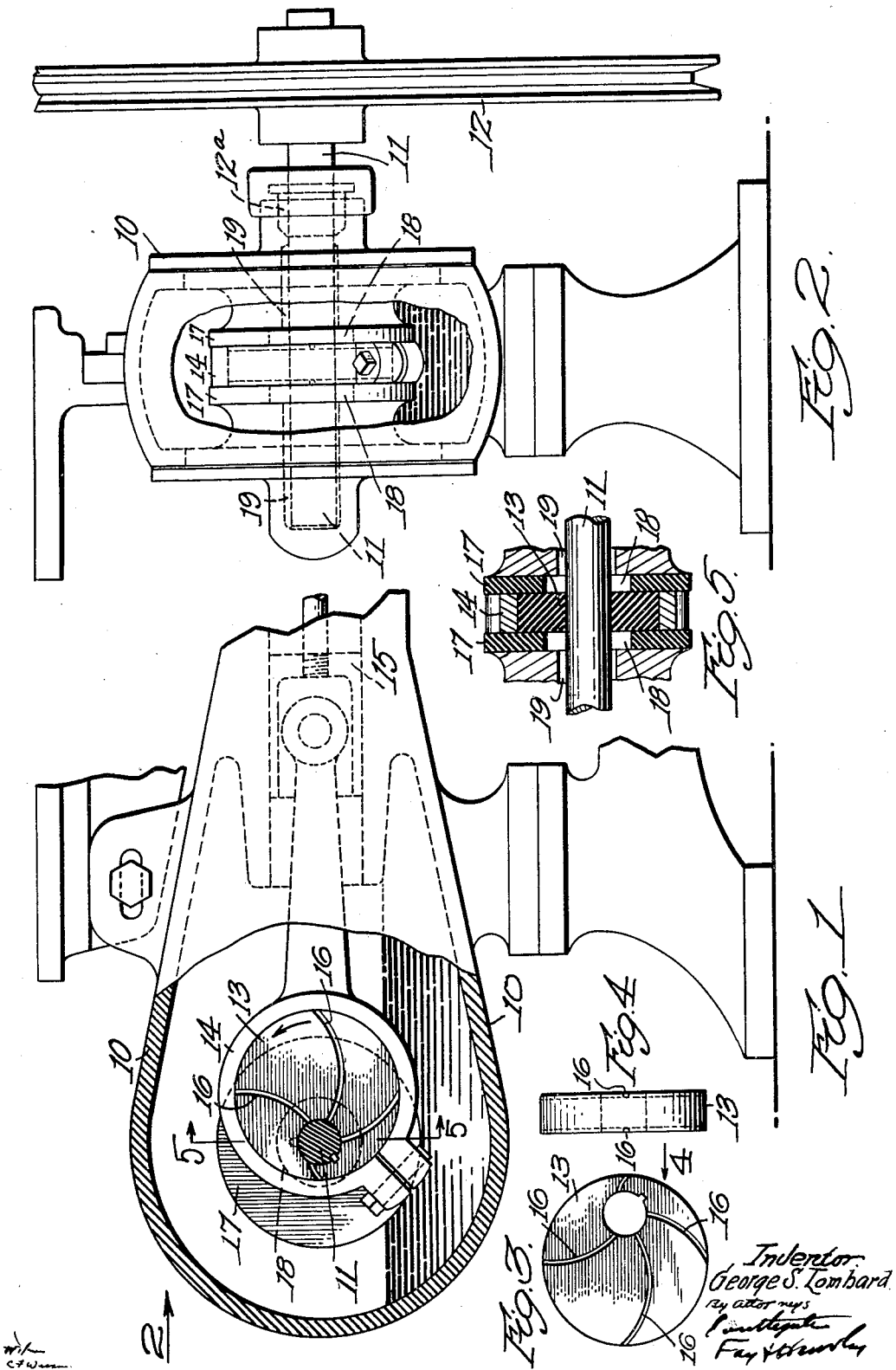

250
UNITED STATES PATENT OFFICE 1,937,237

LUBRICATING SYSTEM

George S. Lombard, Augusta, Ga., assignor to Lombard Iron Works & Supply Company, Augusta, Ga., a corporation of Georgia Application November 21, 1932
Serial No. 643,679

5 Claims. (Cl. 184—24)

This invention relates to lubricating means for an eccentric or similar rotating member capable of general use but particularly adapted for pumps and the like.

The principal objects of the invention are to provide a simple means for transferring the oil from an oil reservoir to the bearings of the eccentric shaft and to the surface of the eccentric; to provide a construction in which the oil is lifted by a part necessarily rotating in the machine and drained back to the shaft by gravity; to provide a construction which, on account of its simplicity, has no parts that are likely to get out of order or that have to be adjusted, and to provide a construction which will not use any appreciable amount of power.

Other objects and advantages of the invention will appear hereinafter.

Reference is to be had to the accompanying drawing, in which

Fig. 1 is a longitudinal sectional view of a part of an electric house pump showing a preferred form of lubricating device for the eccentric of the pump;

Fig. 2 is an end view of the same;

Fig. 3 is a side view of the eccentric;

Fig. 4 is an edge view of the eccentric, and

Fig. 5 is a sectional view on the line 5—5 of Fig. 1.

As stated, the invention is shown as applied to an electric house pump comprising a casing 10 in which is located a shaft 11 provided with a pulley 12 or the like for receiving power from any desired source. This shaft is mounted in bearings at the sides of the casing 10, one of said bearings being closed and the other having a gland 12ª. The shaft has keyed to it, as usual an eccentric 13 which operates in an eccentric strap 14 to reciprocate a slide 15. The device, which is operated by the eccentric, is not a feature of this invention and it is not shown in full but it is indicated as a pump.

The eccentric is provided with a series of curved but generally radial grooves 16 on both sides. These grooves on each side are located in a plane and they radiate from the shaft 11. Mounted on the inside of the casing 10 at the inner ends of the bearings, and preferably integral with the casing, are a pair of circular discs 17 having plain machined inner sides engaging the eccentric and the eccentric strap with such a fit that the motion of the eccentric with the shaft produces a sort of shearing motion against these discs. The grooves in the eccentric serve to lubricate these surfaces, as will appear. The discs are provided with central recesses 18 and on the top of the bearings are oil ways 19 for directing the oil to the bearings themselves. The casing is provided with lubricating oil up to a convenient level, as indicated in Fig. 1, and constitutes an oil reservoir.

With the eccentric operating in the direction of the arrow in Fig. 1, it will be obvious that, as the arcuate grooves 16 come down into the oil between the discs 17, they are not open to the oil until the ends of these grooves, by their turning motion, extend beyond the edges of the discs on the right, as indicated in Fig. 1. The groove at the bottom is shown in that figure as just about to emerge from that position. The grooves on the opposite sides of the eccentric are open to the oil and they pick up the oil and carry it up with them during the rotation of the eccentric. As they pass up beyond horizontal position, indicated by the second groove in Fig. 1, this oil will drain back into the recesses 18 and fill the oil ways 19 at the top of the shaft. As this action is repeated over and over a large amount of oil is transferred by the action of gravity to the bearings of the shaft. It is then conveyed by other oil ways back into the oil reservoir or sump to be picked up again and circulated over and over.

It will be noticed that the oil in the groove 16 fully lubricates the surfaces of the discs 17 and between the eccentric and the eccentric straps which bear on said surfaces and that the oil is free to move along the surfaces between the eccentric strap and eccentric, which necessarily require a material amount of lubrication. Some of the latter lubrication is secured by oil draining out of the grooves 16 after they pass the vertical and deposit a little oil on the eccentric surface while they are moving back down to a position to pick up oil from the supply in the oil reservoir.

The curvature of the grooves is an important feature. By having them curved in the way shown so that, on the side of the eccentric that is moving upwardly, the grooves are concave and they constitute pockets holding the oil until each groove moves far enough up to drain it down into the recesses 18. In this way the oil is not thrown out by centrifugal force at low speeds but is drained back into the bearings of the shaft. If the speed is high enough, the oil will be thrown out at the edges of the eccentric where it will oil the surface between the eccentric and the eccentric strap. In that case the oil will drain back eventually toward the shaft.

This is a very simple lubricating device, adding practically nothing to the mechanism of the pump, containing no parts that are likely to get out of order in operation, and adding very little to the expense of the construction. The location of the two discs 17 against the sides of the eccentric strengthens the whole mechanism, avoids any side play of the eccentric and yet the surfaces that provide for this action are fully lubricated at all times.

Although I have illustrated and described only one form of the invention I am aware of the fact that modifications can be made therein by any person skilled in the art without departing from the scope of the invention as expressed in the claims. Therefore I do not wish to be limited in this respect otherwise than as set forth in the claims but what I do claim is:—

1. The combination with an eccentric for driving a machine and a shaft on which the eccentric is mounted, of a pair of stationary discs located on opposite sides of the eccentric and engaging the same, an oil reservoir in which the eccentric is located, said eccentric being provided with grooves on its sides extending from the center outwardly and adapted to enter the oil below its level to lift the oil as the eccentric rotates and drain it into the bearings of said shaft.

2. In a lubricating device, the combination of an oil reservoir, a shaft located in the reservoir above the level of oil in said reservoir, an eccentric fixed to the shaft, an eccentric strap of the same thickness as the eccentric, a pair of smooth faced circular discs, concentric with the shaft, said eccentric extending beyond said discs on one side on account of its eccentricity, grooves along the sides of said eccentric extending from the shaft to the circumference of the eccentric, whereby said grooves will dip into the lubricant as the eccentric rotates and carry it up to a point above the level of the shaft and thus lubricate the faces of the eccentric and shaft.

3. In a lubricating device, the combination with an oil reservoir, of a shaft located above the level of the oil therein, an eccentric strap therefor, bearings in said casing for said shaft, and a disc fixedly mounted at the inner end of said bearing and having a plain surface which engages the surface of the eccentric and its strap, said eccentric being provided with arcuate grooves on its side extending from the shaft to the circumference of the eccentric and concave on the top of the ascending side of the eccentric, whereby as the eccentric rotates the groove will dip into the oil in the reservoir and carry it up with the eccentric and then drain it back along the surfaces of the eccentric and disc to the shaft at the center.

4. In a lubricating device, the combination with an oil reservoir, of a shaft located above the level of the oil therein, an eccentric on the shaft, bearings in said casing for said shaft, and a pair of discs fixedly mounted at the inner ends of said bearings and having parallel inner plain surfaces which engage the opposite surfaces of the eccentric, said eccentric being provided with arcuate substantially radial grooves on its opposite sides extending from the shaft to the circumference of the eccentric, the eccentricity of the eccentric allowing the eccentric to project beyond the discs at one point around the circumference of the eccentric, said discs having central recesses around the shaft for receiving oil and the bearings having oil ways above the shaft for directing the oil along the shaft to the bearing surfaces.

5. The combination with an oil reservoir, a shaft therein and an eccentric on the shaft having arcuate grooves on opposite sides thereof extending from the shaft to the circumference of the eccentric and concave on their upper sides on the ascending side of the eccentric to hold the lubricant therein until each groove has ascended to a point above the center of the shaft, of a pair of discs in opposite sides of the eccentric fitting the surfaces thereof to retain the oil therein.

GEORGE S. LOMBARD.